(12) United States Patent
Gao et al.

(10) Patent No.: US 6,999,645 B2
(45) Date of Patent: Feb. 14, 2006

(54) WAVEGUIDE CROSSING

(76) Inventors: Zhan Gao, Ludwig-Erhard-Allee 18, München (DE) 81739; Jens Dieckröger, Lofererstrasse 12, München (DE) 81671

( * ) Notice: Subject to any disclaimer, the term of this patent is extended or adjusted under 35 U.S.C. 154(b) by 83 days.

(21) Appl. No.: 10/706,117

(22) Filed: Nov. 12, 2003

(65) Prior Publication Data

US 2005/0074198 A1    Apr. 7, 2005

(30) Foreign Application Priority Data

Nov. 12, 2002 (DE) ............................... 102 53 438

(51) Int. Cl.
*G02B 6/12* (2006.01)

(52) U.S. Cl. ..................... 385/14; 385/39; 385/50; 385/129

(58) Field of Classification Search ............ 385/14, 385/129–132
See application file for complete search history.

(56) References Cited

U.S. PATENT DOCUMENTS 5,157,756 A * 10/1992 Nishimoto ................. 385/129
5,222,163 A    6/1993 Handa et al.
5,889,902 A    3/1999 Laube et al.
6,198,860 B1 * 3/2001 Johnson et al. ............... 385/28
2002/0159706 A1 * 10/2002 Mitomi et al. ................ 385/50
2004/0190830 A1 * 9/2004 Rasras .......................... 385/39

FOREIGN PATENT DOCUMENTS

| DE | 100 64 579 A1 | 7/2002 |
| DE | 101 22 685 A1 | 11/2002 |
| JP | 62027723 A * | 2/1987 |
| JP | 05060929 A | 3/1993 |

* cited by examiner

*Primary Examiner*—Sung Pak

(74) *Attorney, Agent, or Firm*—Workman Nydkgger

(57) ABSTRACT

The invention relates to a light circuit waveguide crossing with a first integrated optical waveguide and a second integrated optical waveguide, which cross one another. According to the invention, at least one waveguide has a reduced cross-sectional area in the crossing region and/or at least one waveguide is routed locally at an increased crossing angle relative to the other waveguide in the crossing region. This makes it possible to reduce the signal losses occurring in a waveguide crossing and a crosstalk even at relatively small crossing angles.

16 Claims, 5 Drawing Sheets

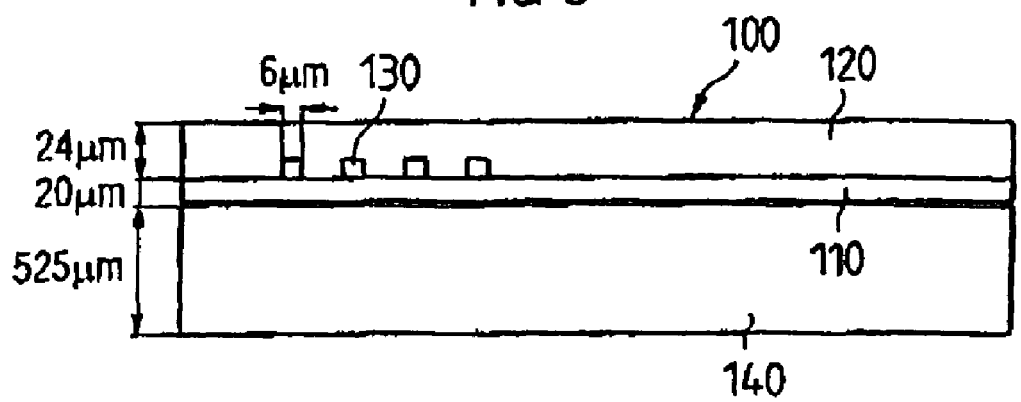
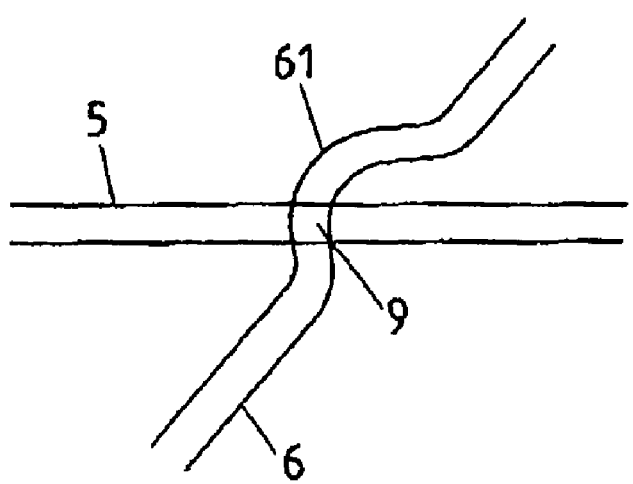

WAVEGUIDE CROSSING

REFERENCE TO RELATED APPLICATIONS

This application claims the benefit of the priority date of German application DE 102 53 438.1, filed on Nov. 6, 2002, the contents of which are herein incorporated by reference in their entirety.

FIELD OF THE INVENTION

The present invention is directed to optical components, and more particularly to waveguide crossings wherein two or more integrated waveguides cross one another in a crossing region, and wherein at least one waveguide has a reduced cross-sectional area in the crossing region and/or is routed locally at an increased crossing angle relative to the other waveguide in the crossing region.

BACKGROUND OF THE INVENTION

An increasing depth of integration in planar light circuits (PLCs) means that waveguide crossings can be avoided to a lesser and lesser extent. By way of example, attenuator units are used to perform a channel-dependent attenuation of the levels of the signals of individual data channels of an array of waveguides. Different levels can be equalized by means of a channel-dependent attenuation. For metrological monitoring of the individual channels of the array, a small part of the optical power (usually between one and ten percent) is coupled out and fed to an evaluation unit for instance in the form of a laterally mounted array of photodiodes. In this case, each monitoring waveguide crosses between 0 and n−1 waveguides of the array, depending on the channel, on its way to a photodiode. The crossovers between the monitoring waveguides and the signal-carrying waveguides of the array lead to channel-dependent losses and to a crosstalk of the other waveguides of the array.

Generally, waveguide crossings have the disadvantage that they cause a signal loss, on the one hand, and bring about a crosstalk between the crossing waveguides, on the other hand. It is known in this case that the signal loss and the crosstalk decrease as the crossing angle increases. In order to keep down crosstalk and signal loss in a waveguide crossing, it is accordingly expedient to realize the largest possible crossing angles of greater than 40°. However, this disadvantageously leads to larger chip dimensions.

DE 100 64 579 A1 discloses a waveguide crossing in which one of the crossing waveguides is designed such that it is interrupted in the crossing region. This solution is suitable primarily for waveguide crossings in which the crossing waveguides are arranged essentially perpendicular to one another.

SUMMARY OF THE INVENTION

The present invention is based on the object of providing light circuits with a waveguide crossing which leads to the least possible signal losses and the least possible crosstalk and which at the same time can also be used at relatively small crossing angles.

This object is achieved according to the invention by means of a waveguide crossing in a light circuit comprising first and second integrated optical waveguides which cross one another in a crossing region, in which at least one waveguide has a reduced cross-sectional area in the crossing region and/or is routed locally at an increased crossing angle relative to the other waveguide in the crossing region.

In accordance with a first aspect of the invention, the cross section of the crossing waveguides is thus reduced in the crossing region, i.e., the mutually penetrating region of the two waveguides is reduced compared with if the waveguides crossed one another without a constriction. The crossing loss and the crosstalk are considerably reduced as a result of this. After the constriction in the crossing region, the waveguides expand again to their original cross-sectional area.

The waveguide cross section can be reduced by means of a reduced width (parallel to the substrate surface), a reduced height (vertically with respect to the substrate surface) or a reduction both of the width and of the height of the waveguide, wherein varying the width may be easier to realize from a production engineering standpoint.

In a preferred refinement of the first-mentioned aspect of the invention, the tapering region or the expanding region of the waveguide is formed by a taper, in particular a linear taper. Tapers, also referred to as horn structures, are waveguide structures which vary so slowly ("adiabatically") along the direction of propagation of the optical wave that the distribution of the optical power over the local eigenmodes is preserved during propagation. This is the case particularly when the waveguide cross section is reduced linearly, as is effected in a linear taper.

In this case, it is preferably provided that the linear taper tapers by at most 50% proceeding from its initial width up to the crossing region. The degree of tapering is preferably between 10 and 30%, particularly preferably 15%. By way of example, the waveguide tapers in the region of the linear taper over a length of about 400 μm proceeding from a width of 6 μm by a factor of 0.5 to 3 μm, in particular by 1 to 2 μm, in particular by 1 μm. In this regard, the tapering of the waveguide may be accompanied by progressive deterioration in the wave guidance and thus an increasing tendency toward emission. Excessively large constrictions therefore lead to large additional losses.

A tapering of the waveguide or a cross-sectional reduction in the crossing region is preferably effected in both of the crossing waveguides, as a result of which the crossing losses are reduced to a particularly high degree.

A second aspect of the present invention provides a local increase in the crossing angle of the crossing waveguides, i.e. the crossing angle of the waveguides is greater in the crossing region than outside the crossing region. The crossing loss and crosstalk are reduced as a result of this. Since the crossing angle is only altered locally and the waveguides run at a smaller angle with respect to one another outside the crossing region, the local increase in the crossing angle does not lead to an enlarged space requirement and larger chip dimensions.

In a preferred refinement of the second aspect of the invention, a local change in the waveguide course for increasing the crossing angle is effected by a plurality of asymmetrically designed linear tapers. An asymmetrical design of the linear tapers is provided in order that a different crossing angle is made available locally.

It is preferably the case that at least one waveguide has four linear tapers in the crossing region, the waveguide tapering in the first linear taper, expanding in the second linear taper, tapering in the third linear taper and expanding again in the fourth linear taper, and the actual waveguide crossing being effected in the region of the two central linear tapers. Preferably, both waveguides are designed in this way.

The asymmetry of the linear tapers is preferably formed by virtue of the fact that a tapering or expanding respectively takes place on only one longitudinal side of the waveguide, while the other longitudinal side extends rectilinearly. Such an asymmetry has the advantage of a simple design and can be produced relatively easily. Preferably, two rectilinear sides respectively adjoin one another in the case of the first and second linear tapers and also in the case of the third and fourth linear tapers. By contrast, the rectilinearly running longitudinal sides are formed on different sides in the case of the second and third linear tapers. This results in a slant of the second and third regions relative to the original course direction of the waveguide, which leads to a locally increased crossing angle.

In an alternative refinement, a locally altered crossing angle is formed by a waveguide section which is routed arcuately in the crossing region.

The waveguide crossing according to the invention is preferably realized at monomode integrated waveguides, as are usually used in planar light circuits. In principle, however, the waveguide crossing according to the invention can also be realized at multimode waveguides.

BRIEF DESCRIPTION OF THE DRAWINGS

The invention is explained in more detail below using a plurality of exemplary embodiments with reference to the figures of the drawing, in which:

FIG. 6 shows a cross section through an integrated optical circuit; and

FIG. 7 diagrammatically shows a third waveguide crossing with two crossing waveguides, a local increase in the crossing angles being achieved by means of arcuate routing of a waveguide.

DETAILED DESCRIPTION OF THE INVENTION

Figure 1:
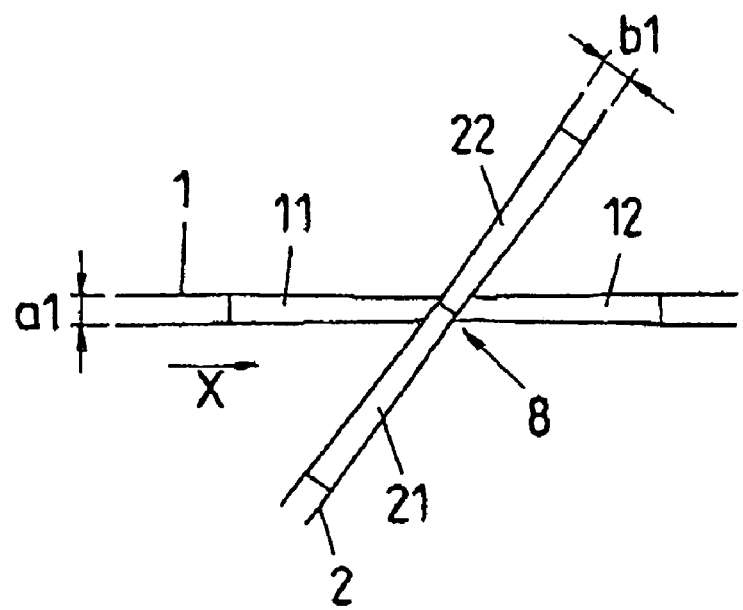
FIG. 1 shows a diagrammatic illustration of a first waveguide crossing with two waveguides that are tapered in the crossing region.

FIG. 1 shows a waveguide crossing with a first waveguide 1 and a second waveguide 2. The waveguides 1, 2 are of integrated optical design, for example in the $SiO_2/Si$ material system, as illustrated by way of example in FIG. 6.

In accordance with FIG. 6, a planar light circuit 100 has a silicon wafer 140, onto which are deposited, in order to produce a desired waveguide structure, three $SiO_2$ layers having different refractive indices, which are referred to as the buffer layer 110, core layer and covering layer 120. In this case, the buffer layer 110 adjoins the silicon substrate 140. The core layer is situated between the buffer layer 110 and the outer covering layer 120.

Before the core layer is covered with the covering layer 120, it is patterned with the aid of a photolithographically produced mask and an etching method, so that only individual ribs 130 of said core layer remain. These ribs 130 are coated with the covering layer 120 and form the light-guiding waveguide core of the planar light circuit 100. By way of example, the light-guiding waveguide cores 130 are situated such that they are buried at a depth of about 20 $\mu$m in an $SiO_2$ layer system 110, 120 having a thickness of approximately 40 $\mu$m. They typically have a cross section of approximately 6 $\mu$m by 6 $\mu$m. In order to couple light into the respective waveguide core 130, an optical glass fiber is positioned at the end face of the chip with the planar light circuit 100, as is known per se, so that this will not be discussed any further.

FIG. 1 thus shows two optical waveguides 1, 2 which, by way of example, are designed in accordance with FIG. 6 in a planar optical substrate. In this case, the reference symbols 1, 2 strictly speaking denote the respective waveguide core.

The waveguides 1, 2 have an initial width a1, b1, which each waveguide 1, 2 has both before and after the waveguide crossing and which represents the "normal" width of the waveguides 1, 2. As a rule, the two waveguides 1, 2 will in this case have the same width, i.e. a1=b1, although this is not necessarily the case.

The waveguides 1, 2 have in each case two linear tapers 11, 12, 21, 22 in the crossing region, which linear tapers, proceeding from the initial width a1, b1, narrow up to the crossing center 8 and expand after the crossing center 8. In the direction X of a light signal considered which is guided in the optical waveguide 1, the waveguide 1 thus firstly narrows in the first linear taper 11 and expands to the original width again after the waveguide crossing 8 in the second linear taper 12. The same applies to the crossing waveguide 2.

The length of a taper 11, 12, 21, 22 is preferably about 400 $\mu$m. In this case, the two crossing waveguides 1, 2 taper by preferably about 0.5 $\mu$m to 3 $\mu$m, preferably by about 1 to 2 $\mu$m, in particular by about 1 $\mu$m.

The waveguide cross section may be reduced, in principle, by a reduced width, a reduced height or a reduction both of the width and of the height of the waveguide, wherein one or both of the crossing waveguides have an initial cross-sectional area outside the crossing region and a reduced cross-sectional area in the crossing region, the reduced cross-sectional area being smaller than the initial cross-sectional area. In the diagrammatic exemplary embodiment illustrated, a lateral linear taper is involved, wherein the width of the waveguide is reduced in the linear taper. In a supplementary manner or as an alternative, however, a vertical taper may also be provided, in which the height of the waveguide is reduced toward the crossing center of the waveguide crossing, which may be a linear taper.

Figure 4:
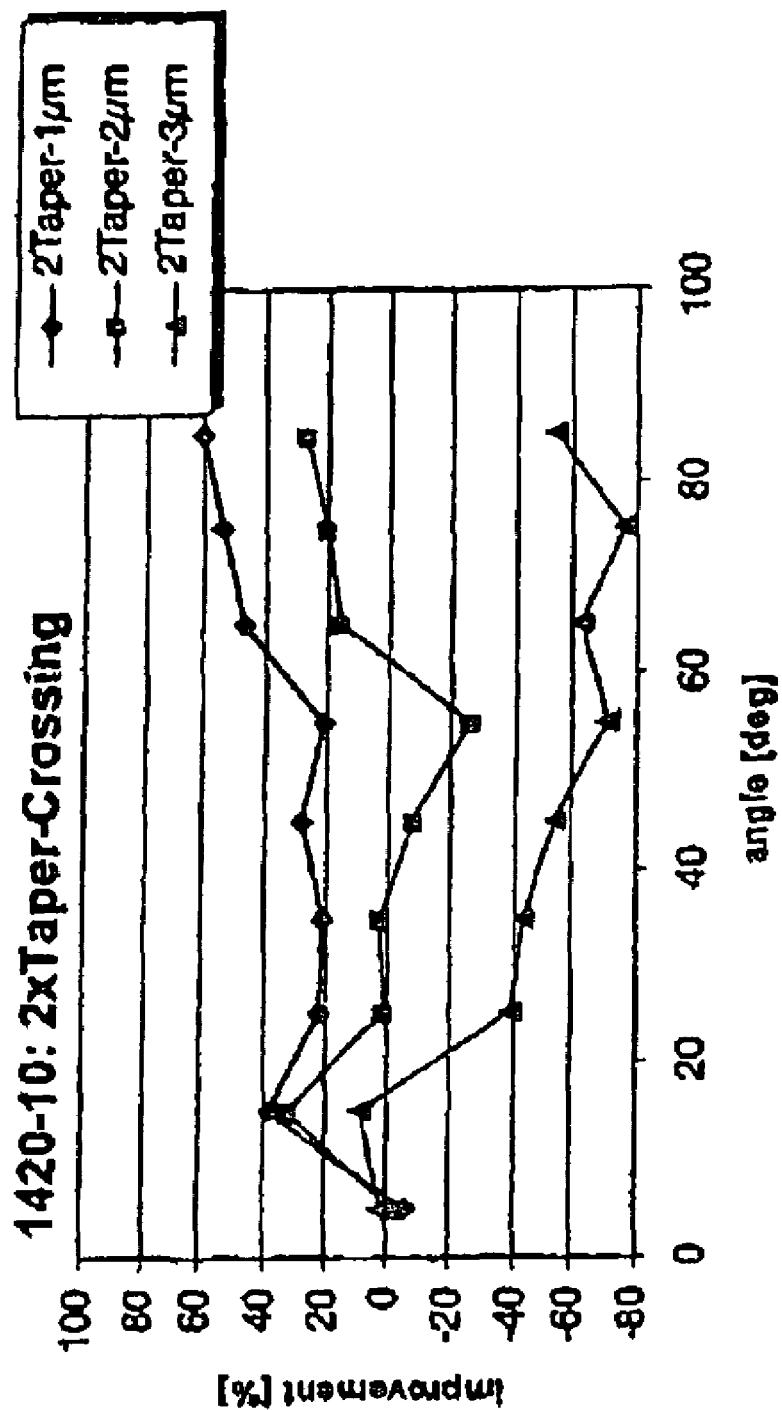
FIG. 4 shows the reduction of the insertion losses as a function of the crossing angle in the case of a waveguide crossing in accordance with FIG. 1.

The success of the described technical solution for reducing signal losses and a crosstalk in a waveguide crossing has been confirmed experimentally and is illustrated graphically in FIG. 4. What was measured in this case was the respective insertion loss of a waveguide with 40 to 60 waveguide crossings for crossing angles of 5 to 85°. In this case, insertion loss denotes a value which represents the difference in the signal strength in the waveguide at the coupling-in point of a light signal and at the coupling-out point after passing through 40 to 60 waveguide crossings. By its nature, the insertion loss is lower, and smaller signal losses and crosstalk are seen at each waveguide crossing.

FIG. 4 illustrates the improvement in the insertion loss as a function of the angle of the respective waveguide crossings. The measurements were performed on tapers which, proceeding from a width of 6 $\mu$m, taper up to the crossing center by 1 μm (rhombus), by 2 μm (square) or by 3 μm (triangle). It can be seen that a reduction of the crossing loss of 20 to 60% is achieved given a tapering by 1 μm for crossing angles of greater than 20°. When the linear taper narrows by 2 μm, the crossing loss is improved in the case of small angles and large angles near 90°. In the case of a large constriction by 3 μm, there is a reduction of the crossing loss only at small angles. This is connected with intensified emission when the waveguide cross section is reduced.

Figure 2:
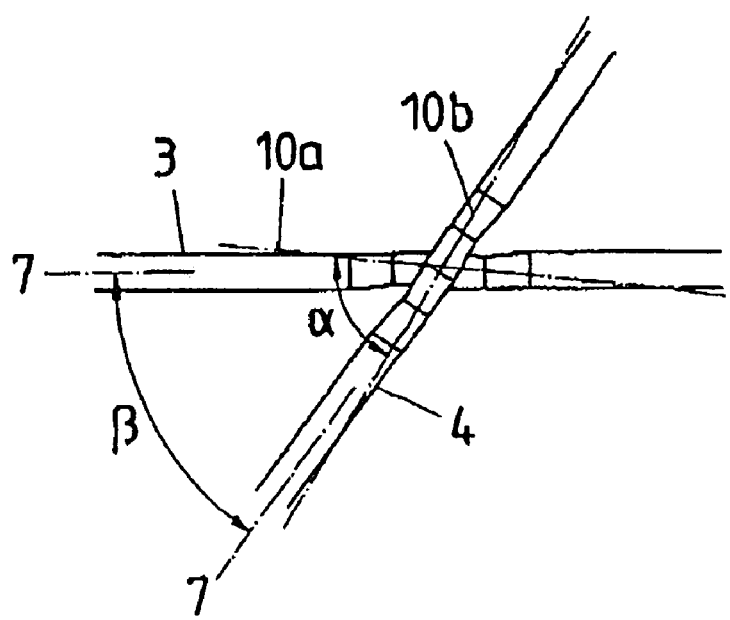
FIG. 2 shows a diagrammatic illustration of a second waveguide crossing with two crossing waveguides which have, in the crossing region, in each case four asymmetrically designed linear tapers for locally increasing the crossing angle.
Figure 3:
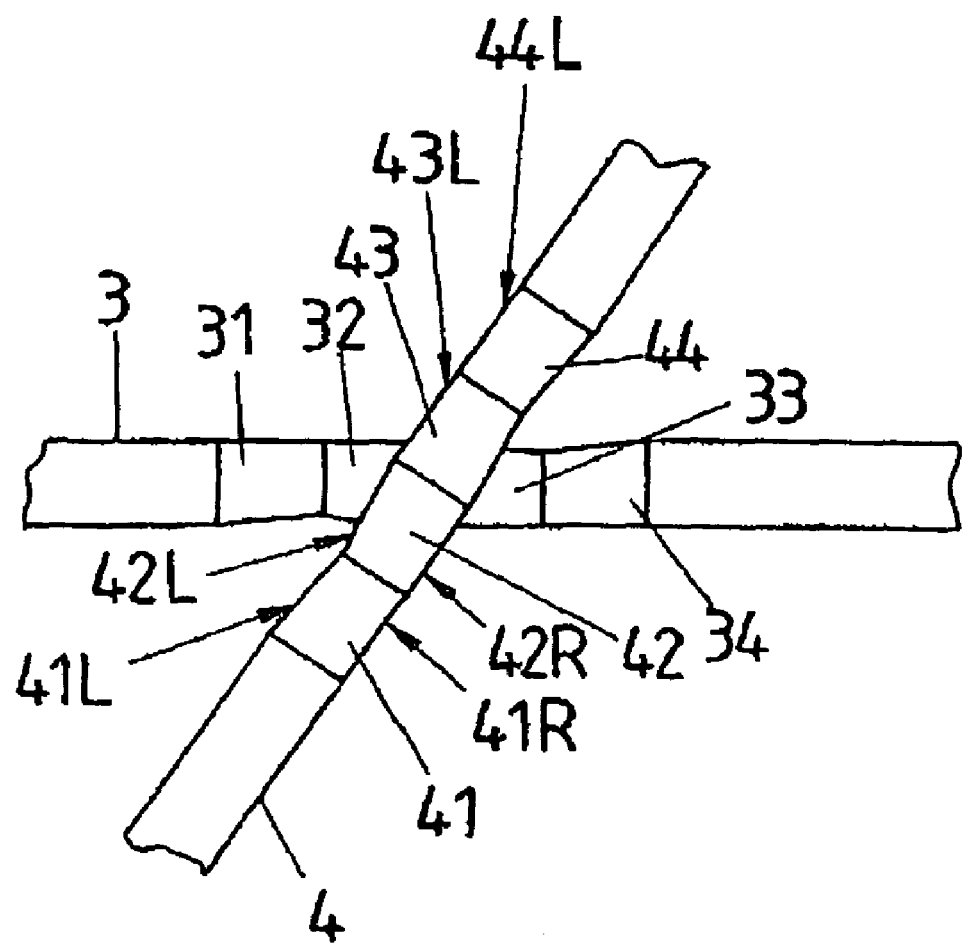
FIG. 3 shows an enlarged illustration of the crossing region of FIG. 2.

A further exemplary embodiment of the invention is illustrated in FIGS. 2 and 3. Provision is once again made of two waveguides 3, 4 having a defined width or a defined cross section which cross in a waveguide crossing. The waveguides are formed in a substrate of a light circuit, for example, in the manner described with reference to FIG. 6.

As can readily be seen in particular from FIG. 3, each waveguide 3, 4 has four linear tapers 31, 32, 33, 34, 41, 42, 43, 44 in the crossing region. As is also set out, all the linear tapers are designed asymmetrically with regard to the longitudinal axis 7 (cf. FIG. 2) of the waveguides 3, 4.

The first linear taper 41 of one waveguide 4 narrows in the direction of its end adjoining the subsequent linear taper 42. It is pointed out here that the right-hand longitudinal side of the taper 41R continues to run rectilinearly and only the left-hand side 41L in the exemplary embodiment illustrated, i.e. the side closer to the other waveguide 3, provides a constriction by virtue of an oblique course.

The adjoining second linear taper 42 has an expansion. However, once again it is only the previously narrowed left-hand side 42L that is expanded, while the right-hand side 42R continues to be routed rectilinearly. In the case of the third and fourth linear tapers 43, 44, the situation is mirror-symmetrical with regard to the crossing point.

In this case, the respective region 41R, 42R, 43L, 44L that is not narrowed or expanded changes side in the actual crossing region, i.e. between the second and third linear tapers 42, 43. As a result of this, the two central linear tapers 42, 43 locally realize a steeper course of the waveguide routing with altered center axes 10a, 10b. The steeper course means that the crossing angle is increased, so that the crossing loss correspondingly decreases. The crossing angle α is thus increased locally relative to the angle β assumed by the two waveguides 3, 4 with respect to one another outside the crossing region, cf. FIG. 2.

The four linear tapers 31, 32, 33, 34 of the other waveguide 3 are also formed in the same way, so that the respective increases in the crossing angle add up.

Figure 5:
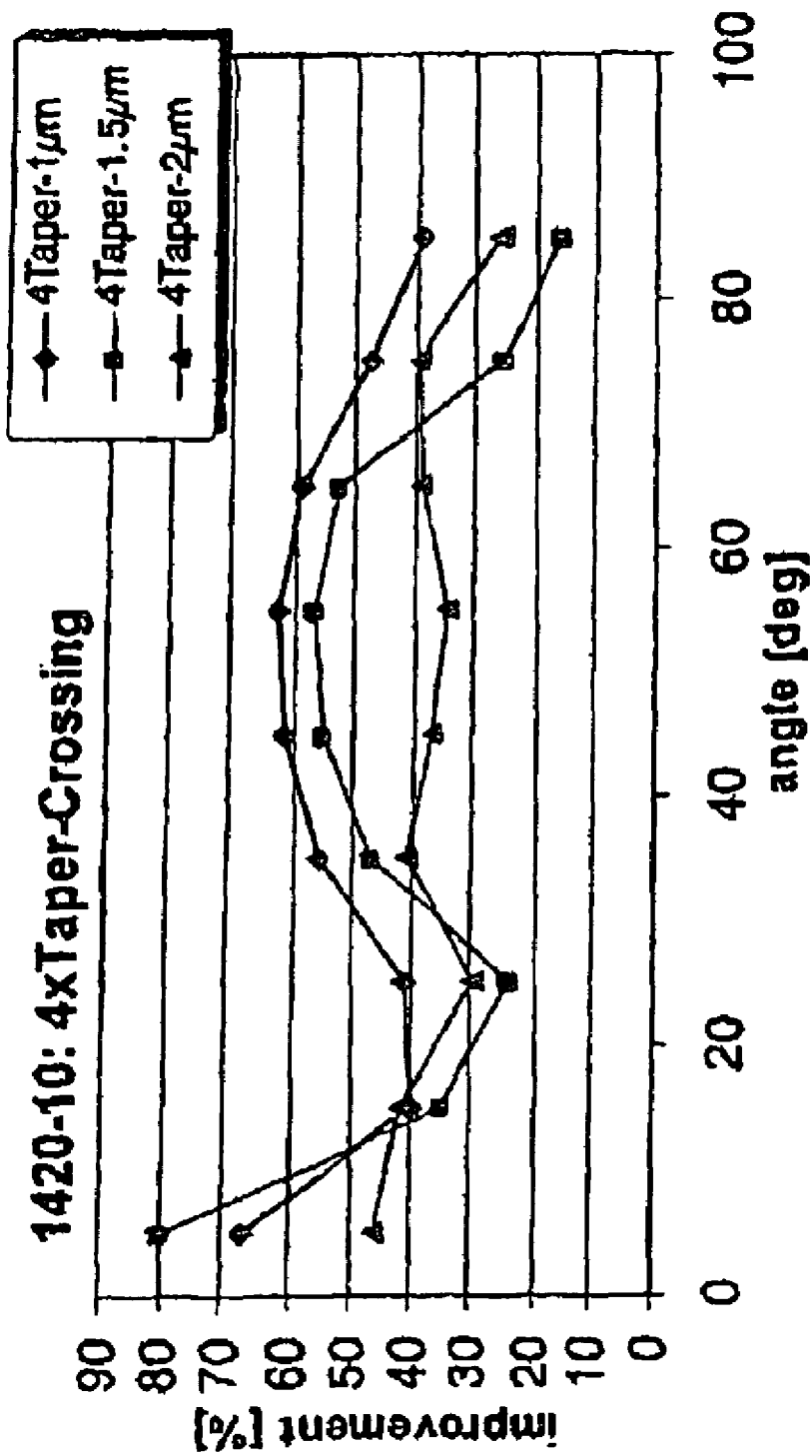
FIG. 5 shows the reduction of the insertion losses as a function of the crossing angle in the case of a waveguide crossing in accordance with FIGS. 2 and 3.

The success of this arrangement in reducing signal losses and a crosstalk in a waveguide crossing is illustrated graphically in FIG. 5. As described with reference to FIG. 4, what was measured was the insertion loss of a waveguide with 40 to 60 crossings for different design variants and crossing angles of 5° to 85°. In this case, the constrictions and expansions of the individual linear tapers were 1 μm (rhombus), 1.5 μm (square) and 2 μm (triangle).

It is noticeable that a reduction of the crossing loss is achieved for all angles in all three variants. The design with a taper which tapers or widens by 1 μm achieves a reduction of the crossing losses of 40 to 60% at all angles.

By its nature, the most favorable dimension of the constriction of the individual linear tapers depends on the technology used both in the case of the exemplary embodiment of FIG. 1 and in the case of the exemplary embodiment of FIGS. 2 and 3. On account of the increasing tendency toward emission of the guided light that accompanies a reduction of the waveguide cross section, a constriction is preferably effected by not more than about 50% of the initial width (a1 or b1 in FIG. 1).

The embodiment for locally increasing the crossing angle of the crossing waveguides as illustrated in FIGS. 2 and 3 has the advantage that it is possible to realize a locally increased crossing angle by resorting to simple, standardized structures, namely linear tapers which are placed against one another. As a result of this, the production of the improved waveguide crossings is relatively simple and cost-effective to realize.

It is further noted with regard to the exemplary embodiment of FIGS. 2 and 3 that, in addition to loss optimization, this embodiment also simplifies the production and reproducibility of the waveguide crossing since the acute angle of the crossing is increased by the constrictions of the outer tapers 31, 41, 34, 44. Acute angles are generally difficult to realize from a production engineering standpoint, for instance on account of roundings that occur.

In principle, however, a local increase in the crossing angle of the crossing waveguides can also be realized in other ways. An alternative exemplary embodiment in this respect is illustrated in FIG. 7. FIG. 7 once again shows two crossing waveguides 5, 6. While one waveguide 5 in the exemplary embodiment illustrated is designed in completely rectilinear fashion and without any taperings or widenings, the other waveguide 6 has an arcuate region 61.

This has the effect that the two waveguides 5, 6 cross at a larger crossing angle in the crossing region 9, so that the crossing loss is reduced. As an alternative, it is also possible for both waveguides to be routed arcuately.

The configuration of the invention is not restricted to the exemplary embodiments represented above. By way of example, in alternative exemplary embodiments, instead of linear tapers, differently formed tapers are used in which a constriction does not have a linear course, but rather obeys other functions, for instance is embodied parabolically. It is also possible to use material systems other than $SiO_2$ on Si (for example the material system lithium niobate ($LiNbO_3$) or InGaAsP on InP) and for the design used and the orders of magnitude to be chosen differently.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A light circuit, comprising:
  a first integrated optical waveguide in an optical substrate; and
  a second integrated optical waveguide in the optical substrate, the first and second integrated optical waveguides crossing one another at a waveguide crossing in a crossing region of the optical substrate;
  wherein the one of the first and second integrated optical waveguides is routed locally at an increased crossing angle relative to the other of the first and second integrated optical waveguides in the crossing region; and wherein the one of the first and second integrated optical waveguides comprises a plurality of asymmetrical linear tapers that provide a local change in a waveguide course of the one of the first and second integrated optical waveguides and increase the crossing angle.

2. The light circuit of claim 1, wherein one of the first and second integrated optical waveguides has an initial cross-sectional area outside the crossing region and a reduced cross-sectional area in the crossing region, the reduced cross-sectional area being smaller than the initial cross-sectional area.

3. The light circuit of claim 2, wherein the one of the first and second integrated optical waveguides has a smaller width and/or a reduced height in the crossing region than outside the crossing region.

4. The light circuit of claim 2, wherein the one of the first and second integrated optical waveguides has an initial width outside the crossing region, narrows over in the direction of the waveguide crossing in a tapering region of a first defined length in the optical substrate, and expands after the waveguide crossing in an expanding region of a second defined length in the optical substrate to the initial width again.

5. The light circuit of claim 4, wherein the one of the first and second integrated optical waveguides has a linear taper in at least one of the tapering region and the expanding region.

6. The light circuit of claim 5, wherein the linear taper of the one of the first and second integrated optical waveguides tapers in its width by an amount of 50% or less.

7. The light circuit of claim 6, wherein the linear taper of the one of the first and second integrated optical waveguides tapers in its width by an amount of 10% or more and 30% or less.

8. The light circuit of claim 7, wherein the linear taper of the one of the first and second integrated optical waveguides tapers in its width by an amount of 15%.

9. The light circuit of claim 5, wherein the linear taper of the one of the first and second integrated optical waveguides tapers from an initial width of 6 $\mu$m by about 0.5 to 3 $\mu$m, and wherein a corresponding one of the first and second defined lengths is approximately 400 $\mu$m.

10. The light circuit of claim 5, wherein the linear taper of the one of the first and second integrated optical waveguides tapers from an initial width of 6 $\mu$m by about 1 to 2 $\mu$m, and wherein a corresponding one of the first and second defined lengths is approximately 400 $\mu$m.

11. The light circuit of claim 5, wherein the linear taper of the one of the first and second integrated optical waveguides tapers from an initial width of 6 $\mu$m by about 1 $\mu$m, and wherein a corresponding one of the first and second defined lengths is approximately 400 $\mu$m.

12. The light circuit of claim 2, wherein both of the first and second integrated optical waveguides have a reduced cross section in the crossing region.

13. The light circuit of claim 1, wherein the one of the first and second integrated optical waveguides comprises four linear tapers in the crossing region, wherein the one of the first and second integrated optical waveguides narrows in the first linear taper in the direction of the waveguide crossing, wherein the one of the first and second integrated optical waveguides expands in the second linear taper, wherein the one of the first and second integrated optical waveguides narrows in the third linear taper, wherein the one of the first and second integrated optical waveguides expands again in the fourth linear taper, and wherein the waveguide crossing occurs in a region of the second and third linear tapers.

14. The light circuit of claim 13, wherein the linear tapers individually comprise first and second opposite longitudinal sides, wherein the narrowing or tapering of the linear tapers takes place on only one longitudinal side, while the other longitudinal side extends rectilinearly.

15. The light circuit of claim 13, wherein two rectilinear longitudinal sides of the first and second linear tapers adjoin one another, wherein two rectilinear longitudinal sides of the third and fourth linear tapers adjoin one another, and wherein the rectilinear longitudinal sides of the second and third linear tapers do not adjoin one another.

16. The light circuit of claim 1, wherein the one of the first and second integrated optical waveguides extends arcuately in the crossing region.

* * * * *